G. W. BROWN.
SEED PLANTER.
No. 12,811. Patented May 8, 1855.
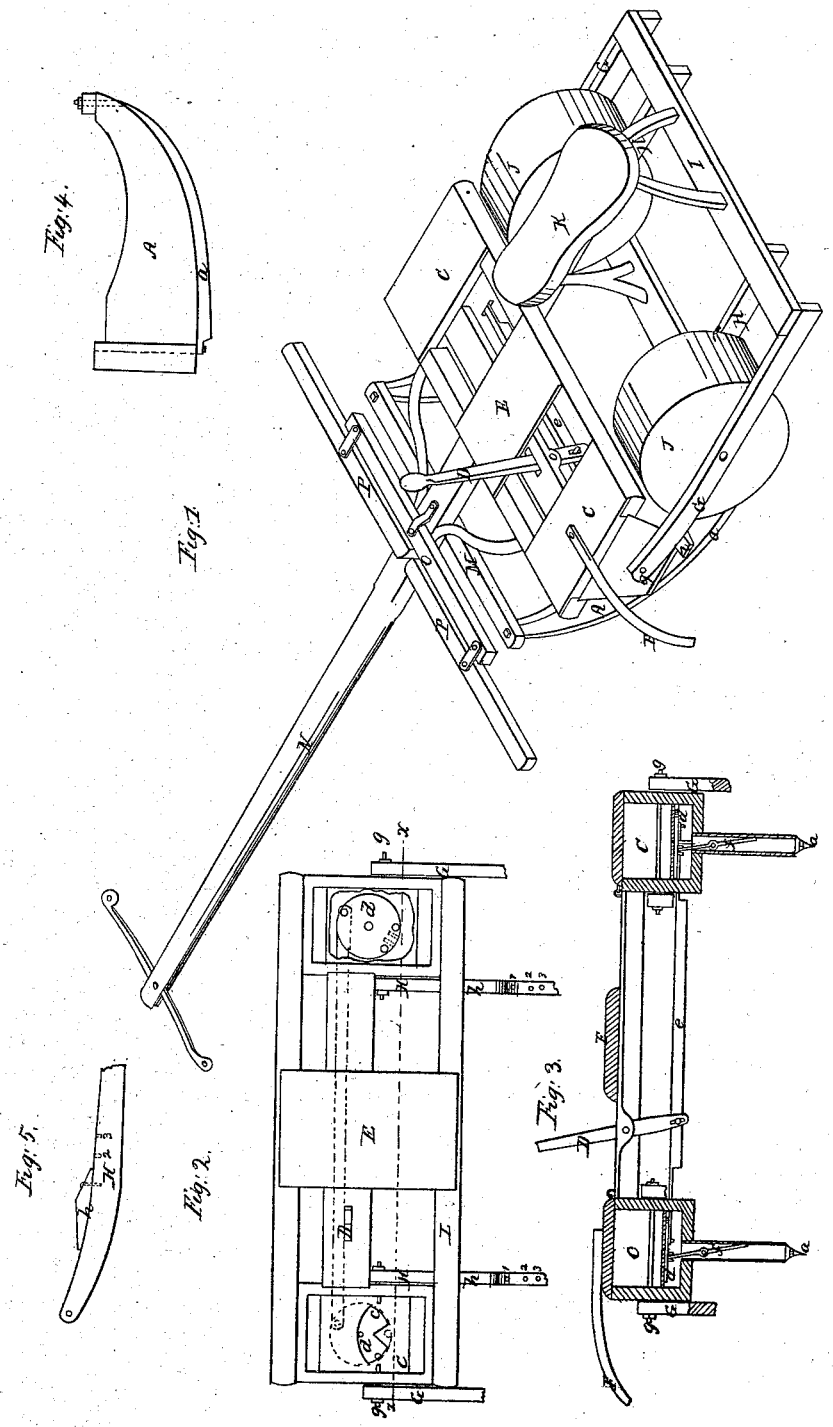

UNITED STATES PATENT OFFICE.

GEORGE W. BROWN, OF GALESBURG, ILLINOIS.

IMPROVEMENT IN SEED-PLANTERS.

Specification forming part of Letters Patent No. 12,811, dated May 8, 1855.

*To all whom it may concern:*

Be it known that I, GEORGE W. BROWN, of Galesburg, in the county of Knox and State of Illinois, have invented certain new and useful Improvements in Seed-Planters; and I do hereby declare the following to be a full, clear, and exact description of the same, reference being had to the accompanying drawings, making a part thereof, in which—

Figure 1 represents a perspective view. Fig. 2 represents a top view of the front part of the machine, with the covers of the seed-hoppers removed to show the interior. Fig. 3 represents a vertical section taken through the red line $x$ $x$ of Fig. 2, and Fig. 4 represents one of the runners detached.

Similar letters in the several figures denote like parts.

A A represent runner-shaped pieces curved up in front and shod with iron, $a$. These pieces are sharp in front, so as to divide the earth and form a furrow, and they widen out at their rear ends and are at said ends hollow, so as to serve as a shoe or tube for conveying the seed to the ground. On top of these runners are arranged the seed-hoppers C C, which have an opening, $c$, in their bottoms, as seen in Fig. 2. Underneath these openings $c$ is a plate, $d$. (Shown partially in dotted lines on the left of Fig. 2 and in full on the right-hand side of said figure.) These two plates $d$ are connected together by a transverse rod, $e$, to which a lever, D, is connected, said lever projecting upward convenient to the operator's seat or stand E, so that he may vibrate said lever when the marker F comes opposite the hill or row previously planted.

In each of the open rear ends of the runners A is pivoted a valve, $f$, Fig. 3, which are connected at their upper ends to the plates $d$, and as these plates $d$ are partially rotated by the vibration of the rod $e$ the valves $f$ also vibrate on their center of motion, so that the charge of seed that is let down from the hopper through the plate $d$ is stopped by the valves $f$ and held until they vibrate again. When this is done the previous charge drops to the ground. Thus by every vibration of the plates $d$ and valves $f$ one charge is dropped into the opening through the rear of the runners and caught and held, and the previous charge is dropped to the ground.

This machine does not drop the seed automatically. On the contrary, it is operated by an attendant riding on the machine, who guides the dropping by the pointer F.

The hoppers and operator's seat, being mounted on the runners, form the front of the machine.

To the sides of the hoppers, at $g$, are hinged two outside supporting-pieces, G G, and to the inside of the hoppers two other supporting-pieces, H H, which several pieces are connected together at their extreme rear ends by the cross-piece I. The supporting and covering wheels J J are hung in these pieces G H, and a driver's seat, K, is arranged on this rear part of the machine.

The inside supporting-pieces, H H, have cam-wedges $h$ $h$, Fig. 2, (a separate side view of one of them being seen in Fig. 5,) which are made adjustable on said pieces H by means of pins or bolts passing through the holes 1 2 3, which makes the depth at which the runners enter the ground, and consequently the depth at which the seed are planted, adjustable at pleasure by slipping said wedges farther forward under the cross-beam L or slipping it farther back, which operations would respectively raise or lower the front part of the machine, and the runners with it.

At each side of the machine, underneath the pieces G, are stops $i$, (one only being seen in Fig. 1,) upon which said pieces G rest, and by which and the cam-wedges under the cross-beam L the driver, by shifting his position on his seat forward or back, may cause his weight to add to the raising or holding down of the front part of the machine, as may be required. When the corn is deposited in the ground the wheels J J roll immediately over the furrows and cover up the seed, pressing the earth at the same time firmly over them.

M is a cross-bar extending across from point to point of the runners A, and to this and the frame in rear of it, is fastened the tongue N for guiding the machine, O being the double and P the whiffletrees to which the horses are attached.

Fig. 4 represents more fully the shape of the runners and the mode of shoeing them with iron. They are wedge-shaped from front to rear, so as to freely open and spread the furrow and afford width behind for the opening and valve $f$, as seen in Fig. 3.

Having thus fully described the nature of my invention, what I claim therein as new, and desire to secure by Letters Patent, is—

In combination with the hoppers and their semi-rotating plates $d$, the runners A, with their valves $f$ and their adjustment, by means of the levers and cams and the driver's weight, for the purpose of carrying and dropping seeds by each vibration of the lever D and to regulate the depth of the planting, as described.

GEORGE W. BROWN.

Witnesses:
 ISAAC DELANO,
 JABEZ EASTES.